United States Patent [19]

Arai et al.

[11] Patent Number: 5,166,485
[45] Date of Patent: * Nov. 24, 1992

[54] FRYPAN FOR BOTH MICROWAVE AND FLAME COOKING

[75] Inventors: Tsutomu Arai; Shingo Kasai, both of Hanazono, Japan

[73] Assignees: Mitsubishi Denki Kabushiki Kaisha, Tokyo; Mitsubishi Electric Home Appliance Co., Ltd., Saitama, both of Japan

[*] Notice: The portion of the term of this patent subsequent to Mar. 17, 2009 has been disclaimed.

[21] Appl. No.: 799,444

[22] Filed: Nov. 27, 1991

Related U.S. Application Data

[63] Continuation of Ser. No. 679,139, Mar. 28, 1991, Pat. No. 5,097,106, which is a continuation of Ser. No. 430,583, Nov. 1, 1989, abandoned.

[30] Foreign Application Priority Data

Nov. 1, 1988 [JP] Japan .................. 63-276406
May 17, 1989 [JP] Japan .................. 1-123173

[51] Int. Cl.$^5$ ............................... H05B 6/80
[52] U.S. Cl. .................. 219/10.55 E; 99/DIG. 14; 220/94 R
[58] Field of Search .............. 219/10.55 E, 10.55 F, 219/10.55 R; 99/DIG. 14, 451; 126/390; 220/94 R; 16/110 A

[56] References Cited

U.S. PATENT DOCUMENTS

| 2,961,520 | 11/1960 | Long | 219/10.55 E |
|---|---|---|---|
| 3,082,906 | 3/1963 | Reed | 16/110 A |
| 3,836,744 | 9/1974 | Taketo | 219/10.493 |
| 3,974,354 | 8/1976 | Long | 219/10.55 E |
| 4,165,855 | 8/1979 | Mason, Jr. | 249/182 |
| 4,258,630 | 3/1981 | Jorgenson et al. | 219/10.55 E |
| 4,283,614 | 8/1981 | Tanaka et al. | 219/10.55 E |
| 4,362,917 | 12/1982 | Freedman et al. | 219/10.55 E |
| 4,410,779 | 10/1983 | Weiss | 219/10.55 F |
| 4,505,390 | 3/1985 | Kirk, Jr. | 16/110 A |
| 4,644,858 | 2/1987 | Liotto et al. | 219/10.55 E |
| 4,763,790 | 8/1988 | McGeehins | 219/10.55 E |
| 4,818,832 | 4/1989 | Fukumoto | 219/10.55 E |
| 4,868,360 | 9/1989 | Duncan | 219/10.55 E |
| 5,097,106 | 3/1992 | Arai et al. | 219/10.55 E |

FOREIGN PATENT DOCUMENTS

| 0240235 | 10/1987 | European Pat. Off. |
|---|---|---|
| 2508263 | 9/1976 | Fed. Rep. of Germany. |
| 2356373 | 1/1978 | France. |
| 588645 | 5/1947 | United Kingdom. |
| 8701550 | 3/1987 | World Int. Prop. O. |

Primary Examiner—Philip H. Leung
Attorney, Agent, or Firm—Oblon, Spivak, McClelland, Maier & Neustadt

[57] ABSTRACT

A microwave cooking apparatus having a frypan which may be used both for microwave cooking and cooking with fire so that a burned portion may be quickly obtained on the food while the inside of the food is also sufficiently heated. The frypan has a handle which does not become hot in the microwave apparatus. A rotating plate may be controlled to stop when the handle is in a desired position. Dish receiving shelves may be formed in the microwave apparatus which are spaced at a distance greater than the diameter of the frypan.

2 Claims, 14 Drawing Sheets

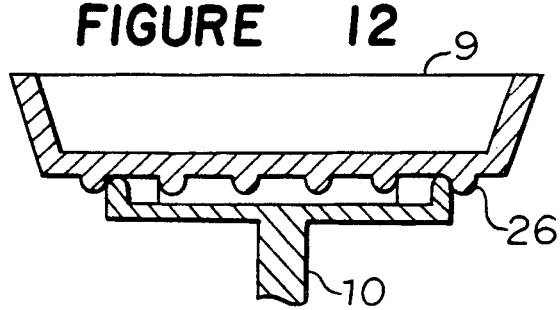
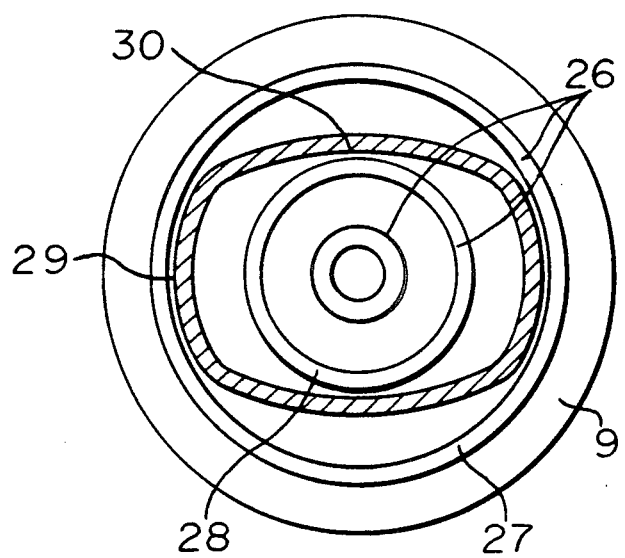
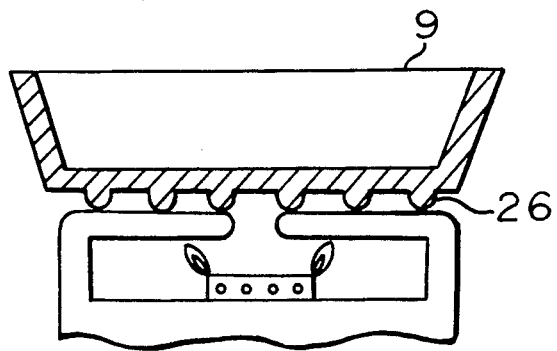

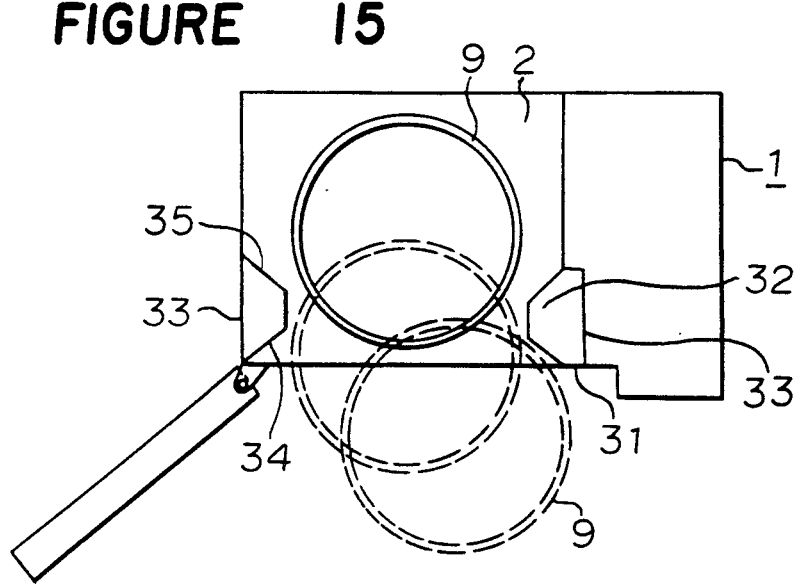
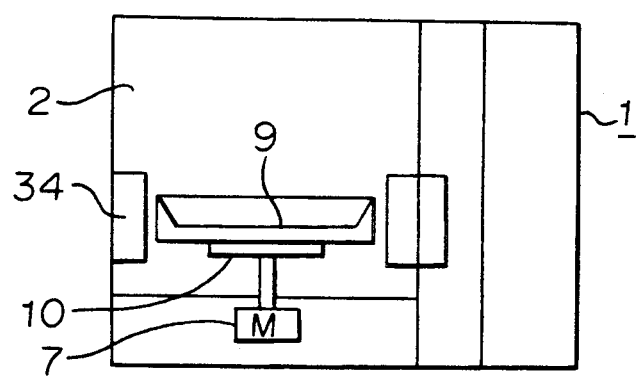
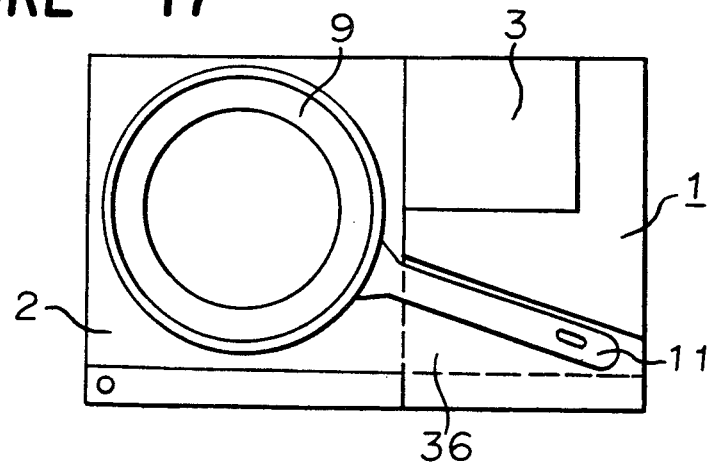

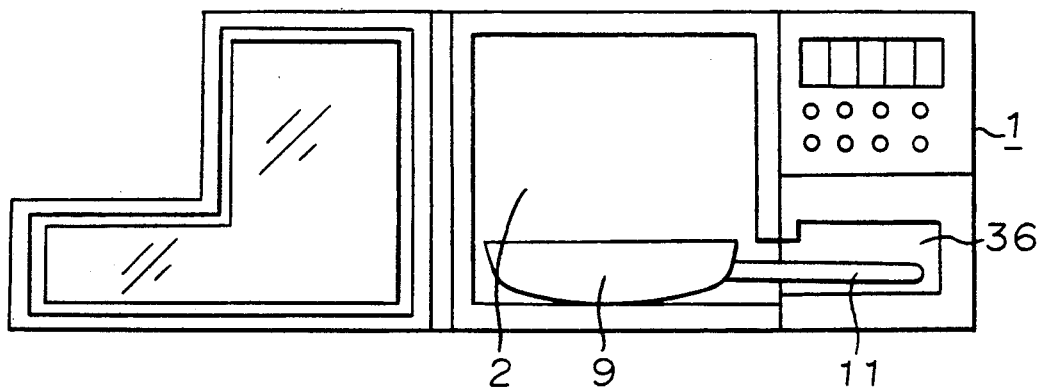
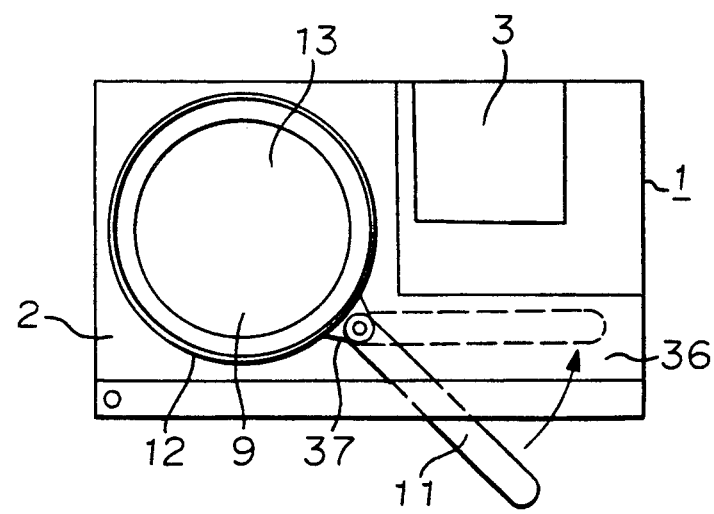
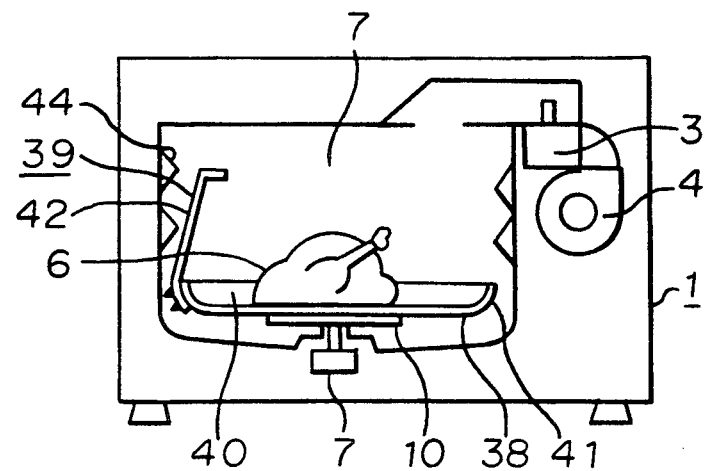

FRYPAN FOR BOTH MICROWAVE AND FLAME COOKING

This is a continuation of application Ser. No. 07/679,139, filed on Mar. 28, 1991, now U.S. Pat. No. 5,097,106, which is a continuation of Ser. No. 07/430,583, filed on Nov. 1, 1989, now abandoned.

The present invention relates to a microwave cooking apparatus wherein cooking of a material to be cooked put on a frypan is subjected to cooking in a microwave cooking apparatus, the frypan being also applicable to cooking with use of a portable cooking stove.

A conventional microwave heat cooking apparatus will be described with reference to FIG. 36.

In FIG. 36, a reference numeral 1 designates a microwave cooking apparatus main body, a numeral 2 designates a heating chamber formed in the main body, a numeral 3 designates a microwave oscillating apparatus placed in the heating chamber to emit microwaves, a numeral 4 designates a blower to cool the main body and a numeral 5 designates a turn table for receiving thereon a material to be cooked 6 (hereinbelow, referred to as a cooking material). The turn table 5 is generally made of glass, china, ceramic or the like which is poor in thermal conductivity, has a large heat capacity and is easily broken when it is dropped. On the other hand, a metallic turn table has been proposed, which is made of a thin steel plate on which a porcelain enamel layer is coated. The metallic turn table has also a disadvantage that the porcelain enamel layer is easily broken when the turn table is dropped. A numeral 7 designates a motor to rotatably support the turn table 5 from the outside of the bottom portion of the heating chamber 2 through a rotating plate 8. In the conventional microwave heat cooking apparatus having the above-mentioned construction, cooking of a cooking material 6 is carried out by microwaves irradiated from the microwave oscillating apparatus 3.

In the conventional microwave cooking apparatus, however, there have been problems that a burn portion can not be given to the cooking material 6 and there is produced gravy so that the meat becomes hard. In order to eliminate such disadvantages, an electronic range or an oven range with a heater is commercialized. However, an electric heater installed in the range has a disadvantage that it takes much time to give a burn portion. For example, when a hamburg steak is to be cooked, it takes 15 minutes for provisionally heating and it takes 15 minutes for regular cooking. Further, it has a disadvantage that workability is poor in reversing a cooking material 6 in an oven range.

There has been well known a cooking method wherein a cooking material is put on a frypan which is heated on fire from a portable cooking stove. This method facilitates the reversing operation of the cooking material. However, it has problems that control of fire is not easy and a cooking material is burnt too much or it takes much time until the inside of the cooking material is sufficiently heated.

In the conventional microwave cooking apparatus, if the turn table 5 carrying thereon a cooking material 6 is removed from the microwave cooking apparatus main body 1 and the turn table 5 with the cooking material 6 is put on a portable cooking stove, the turn table 5 which is made of glass or the like which is weak to heat from the portable cooking stove and has poor thermal conductivity, is apt to be broken when it is dropped by mistake. Further, when the turn table 5 on which the cooking material 6 is put is applied to the portable cooking stove, oil for cooking tends to fall beyond the edge.

It is an object of the present invention to eliminate the above-mentioned problems and to provide a heat cooking method and a microwave cooking apparatus which can give quickly a burn portion on a cooking material and allows heat to sufficiently be permeated inside the cooking material.

According to the present invention, there is provided a heat cooking method which comprises heating a material to be cooled put on a frypan by either one between a heat cooking method with use of a heat source and a heat cooking method with use of a microwave cooking apparatus, and then heating the material by the other method.

In accordance with the present invention, there is provided a microwave cooking apparatus which comprises a microwave cooking main body and a frypan which is adapted to be received in the main body and is capable of withstanding radiation of microwaves in the microwave cooking main body and which is capable of withstanding an intense heat by a portable cooking stove.

In drawings:

FIGS. 12 through 14 are respectively diagrams showing several states of the frypan according to the eighth embodiment of the present invention;

FIGS. 15 and 16 are respectively diagrams showing the entire structure according to the second embodiment of the microwave cooking apparatus main body of the present invention;

FIGS. 17 and 18 are respectively diagrams showing the entire structure according to the third embodiment of the microwave cooking apparatus main body of the present invention;

FIG. 19 is a diagram showing the entire structure according to the fourth embodiment of the microwave cooking apparatus main body of the present invention;

FIG. 20 is a diagram showing the entire structure according to the fifth embodiment of the microwave cooking apparatus main body and the ninth embodiment of the frypan of the present invention;

FIRST EMBODIMENT

Figure 1:
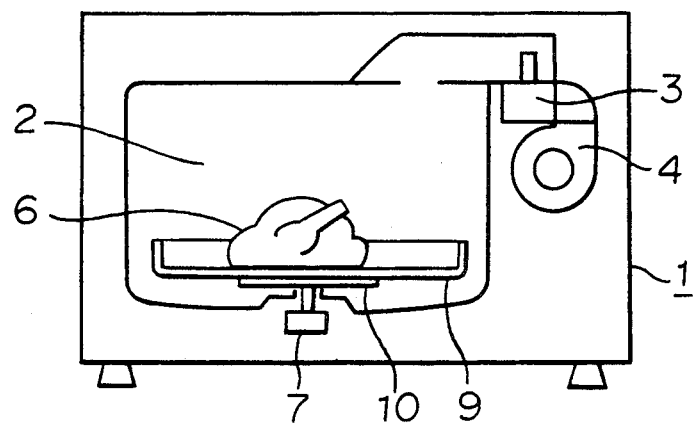
FIG. 1 is a diagram showing an embodiment of the entire structure of the microwave cooking apparatus according to the present invention.
Figure 36:
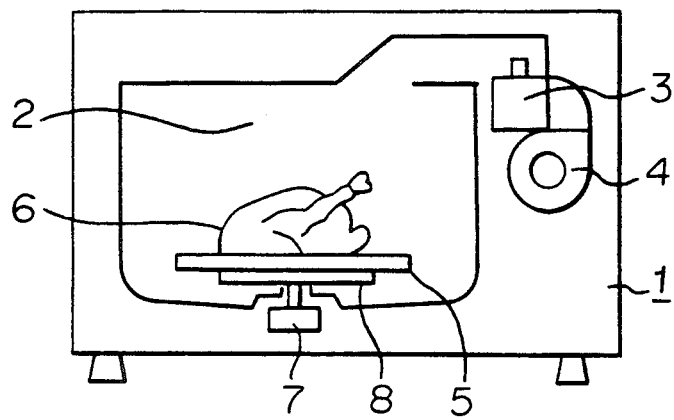
FIG. 36 is a diagram showing the entire structure of a conventional microwave cooking apparatus.

The first embodiment of the heat cooking method and the microwave cooking apparatus of the present invention will be described with reference to FIG. 1;

In FIG. 1, numerals 1 through 4 and 6 and 7 designate the same parts as those as shown in FIG. 36 and description of these parts is omitted. A numeral 9 designates a frypan which is supported by a rotating plate 10 so as to be freely rotatable by means of the motor 7. The frypan 9 is substantially circular and is made of an aluminum alloy.

The operation will be described. The frypan 9 is removed from the heating chamber 2 and oil is applied to the upper surface of the frypan. Then, it is put on a portable cooking stove (such as an electric heater, a gas heater, an electromagnetic induction heater, a portable clay cooking stove or the like although it is not shown in FIG.) so that provisionally cooking is conducted by a strong heat. When a burn portion is given to the backside of the cooking material 6, it is reversed by a flat spoon. Then, the cooking material is put in the heating chamber 2 together with the frypan 9 and regular cooking is finished by baking the inside of the cooking material 6 by microwaves. The top surface of the cooking material 6 has been reversed and is in contact with the upper surface of the frypan 9 in the heating chamber 2, and the surface in contact with the frypan is burnt with the aid of oil applied to the surface of the frypan.

Thus, burn portions can be formed on the top and back surfaces of the cooking material 6 and the inside of the material 6 can be heated quickly whereby a time of cooking can be remarkably reduced.

When a hamburg steak is to be cooked, it takes about 5 minutes to give a burn portion to the hamburg steak by using a portable cooking stove and it takes about ½ minutes until the inside of the cooking material can be sufficiently heated in a microwave cooking apparatus main body 1. Thus, cooking time can be reduced to less than ⅓ as much as the conventional method of cooking. A shorter cooking time is very effective at a kitchen where preparation of cooking has to be in a hurry.

Since the frypan 9 is usable for cooking with use only a portable cooking stove, the number of frypans in domestic use can be reduced.

Further, since the frypan can be received in the microwave cooking apparatus after the cooking has finished, it is unnecessary to provide a space for the frypan in the cooking place.

In the above-mentioned first embodiment, the regular cooking is conducted in the microwave cooking apparatus after the provisional cooking has been made by the portable cooking stove. However, the same effect can be obtained by carrying out provisionally cooking in the microwave cooking apparatus followed by heating the cooking material by the portable cooking stove for the regular cooking.

Since the frypan 9 which is durable to a strong heat from the microwave cooking apparatus and the portable cooking stove is used, it is unnecessary to transfer a cooking material to a frypan which is generally used in home. This reduces time for cooking.

Further, the frypan 9 is generally circular in shape. Accordingly, it is rotated in the heating chamber keeping the greatest surface area. Accordingly, the greatest volume of the cooking material 6 can be cooked and uneven heating can be avoided.

The frypan 9 can be used for the conventional turning table.

In the above-mentioned embodiment, the frypan 9 is made of an aluminum alloy. However, it may be made of a material having a heat resistance such as iron, stainless steel or the like.

SECOND EMBODIMENT OF THE FRYPAN

Figure 2:
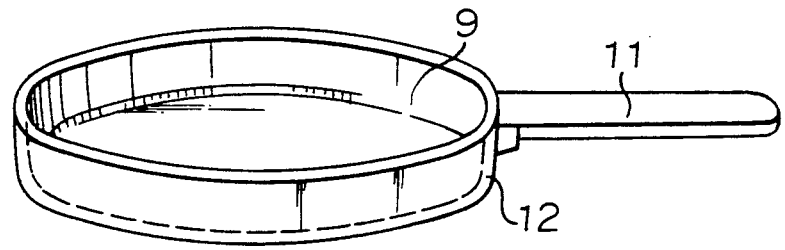
FIG. 2 is a perspective view of the second embodiment of a frypan used for the microwave cooking apparatus of the present invention.

FIG. 2 shows the second embodiment of the frypan 9 in which a handle 11 is formed at the outer peripheral portion 22 of the frypan 9 having a substantially circular shape. With the handle 11, the frypan can be moved into the microwave cooking apparatus or can be removed from it. Further, the frypan 9 can be easily moved by a hand during cooking so that easiness of handling can be improved.

THIRD EMBODIMENT OF THE FRYPAN

Figure 3:
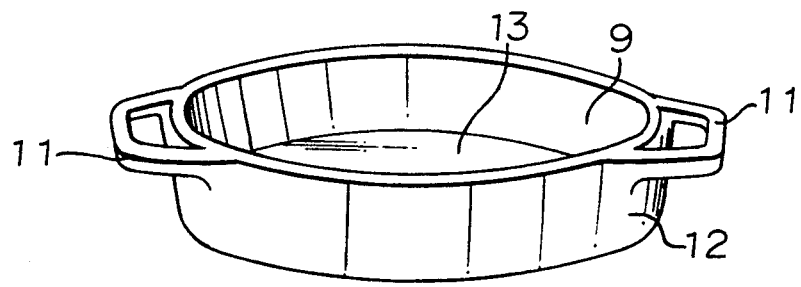
FIG. 3 is a perspective view of the third embodiment of the frypan.

FIG. 3 shows the third embodiment of the frypan 9. In FIG. 3, a pair of handles 11 are formed at the outer edge portion of the circumferential portion of the frypan 9 so as to face each other. The opposing handles 11 facilitate supporting the frypan by hands, and the surface area of the frypan 9 can be made large.

When four handles are formed on the frypan at angular intervals of about 90°, one of them must face the front of the apparatus at the end of the rotation of the turning table. Accordingly, it can be easy to remove the frypan from the microwave cooking apparatus.

A handle or handles 11 may be detachably attached to the outer peripheral portion 12 of the frypan 9. In this case, when the frypan 9 is put in the cooking apparatus, the handle or the handles 11 can be previously removed. After the cooking has been finished, the handle 11 or the handles 11 can be attached to the frypan 9 again. Accordingly, it is unnecessary to heat the handle(s) 11, and easiness of handling and safety of cooking can be improved. In addition, it is possible to increase a heating surface 13 to the greatest value because only the frypan is put in the microwave heat cooking apparatus.

FOURTH EMBODIMENT OF THE FRYPAN

Figure 4:
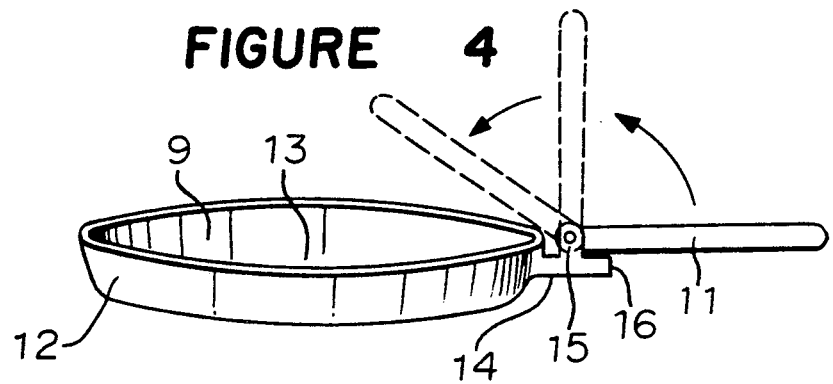
FIG. 4 is a perspective view of the fourth embodiment of the frypan.

FIG. 4 shows the fourth embodiment of the frypan 9.

A projection 14 is formed at the outer peripheral portion 12 of the frypan 9; a pivot shaft 15 is provided at the upper part of the middle portion of the projection 14, and one end of a rod-like handle 11 is supported by the pivot shaft 15 so that the handle 11 can be turned from a horizontal state which is the same direction of the plane of the frypan 9 to a raised position. When the handle 11 is raised, a force to lower the frypan 9 by its deadweight is produced. However, the horizontal state of the frypan can be maintained because the free end 16 of the projection 14 comes in contact with the lower portion of the handle 11. With such construction, it is possible to extend the handle 11 in the substantially horizontal direction when cooking is carried out by using a portable cooking stove, and it is possible to fold the handle 11 in the raising direction when the frypan 9 is to be received in a microwave cooking apparatus main body 1 for cooking by the microwave cooking apparatus. In later case, it is possible to use the frypan having the greatest heating surface 13 because the handle does not extend in the horizontal direction. Further, the frypan can be easily put in he microwave cooking apparatus or removed from the same by turning the handle 11 around the pivot shaft 15 in the raised direction.

FIFTH EMBODIMENT OF THE FRYPAN

Figure 5:
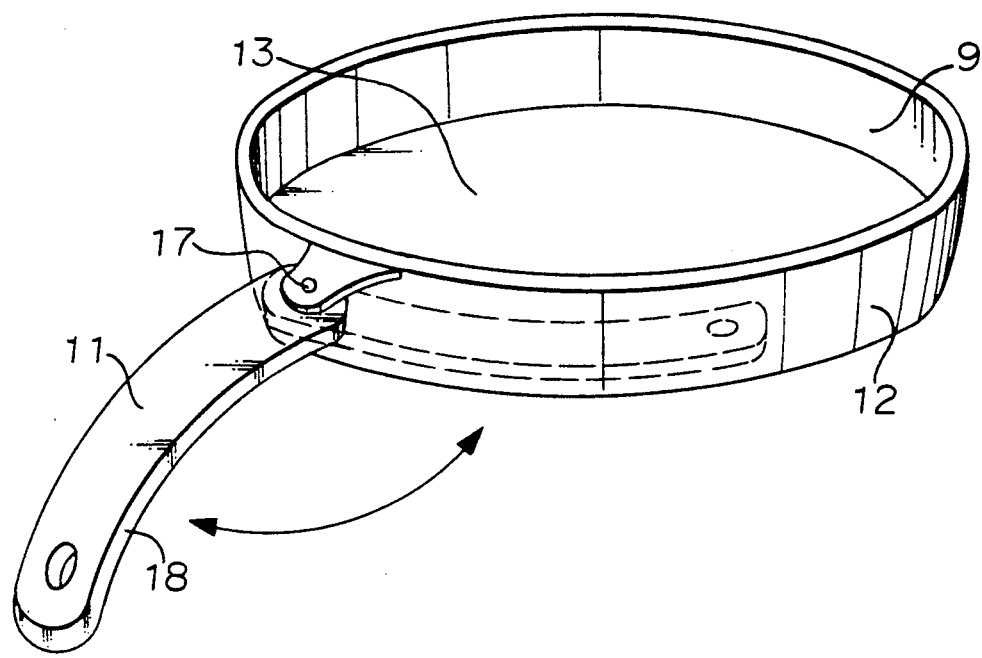
FIG. 5 is a perspective view of the fifth embodiment of the frypan.

FIG. 5 shows the fifth embodiment of the frypan 9. As shown in FIG. 5, a pivotting member is attached to or formed in the outer peripheral portion 12 of the frypan 9 and an end of a handle is supported by a pivot shaft 17 in the pivotting member. The handle 11 has a curved portion so as to be along the curved surface of the outer peripheral portion of the frypan 9. The handle 11 can be freely turned in the same plane as the horizontal plane of the frypan 9 by means of the pivot shaft 17.

When cooking of a cooking material is conducted by the microwave cooking apparatus, the handle 11 having the curved portion 18 can be turned along the curved surface of the outer peripheral portion 12 of the frypan so that there is only a projection corresponding to the width of the handle. Therefore, the heating surface 13 of the frypan 9 can be made large.

When cooking of the cooking material is conducted by using the portable cooking stove, the handle 11 is turned in the direction apart from the outer peripheral portion 12 of the frypan 9 and is fixed at the position orthogonal to the tangent line. The curved portion 18 of the handle 11 gives good fitness to a hand and provides easy handling.

Alternatively, a frypan having a large heating surface can be used by fixing the handle 11 at the outer peripheral portion 12 of the frypan 9 so as to extend in the vertical direction to the heating surface.

The handle 11 may be made by a material which can not be easily heating by microwaves, such as tetrafluoroethylene, polypropylene or the like whereby the handle 11 can be grasped by an empty hand.

SIXTH EMBODIMENT OF THE FRYPAN

Figure 6:
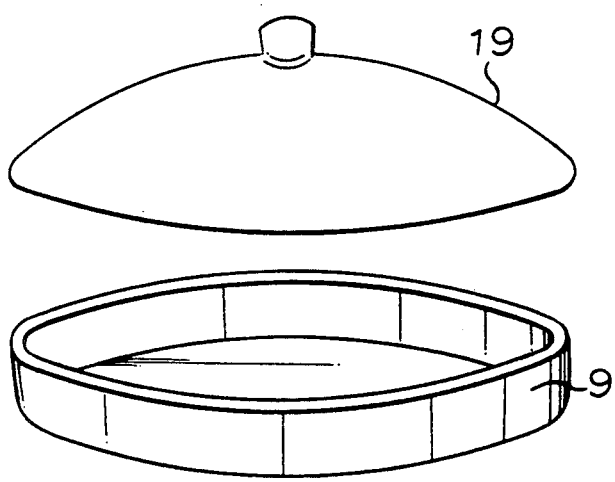
FIG. 6 is a perspective view of the sixth embodiment of the frypan.

FIG. 6 shows the sixth embodiment of the frypan 9. In FIG. 6, a cover member 19 made of a material which permits microwaves to pass through, such as glass, china, ceramic or the like, is fitted to the frypan 9, whereby scattering of oil and a cooking material 6 can be avoided and efficiency of heating is improved.

A layer of a material to absorb microwaves to thereby generate heat, such as ferrite powder, may be coated on the outer surface of the frypan 9. With such structure, the frypan absorbs efficiently the energy of microwaves so that a time of cooking can be shortened.

When the frypan 9 is made of a aluminum alloy, a material which is difficult to be heated by the microwaves and prevents a cooking material 6 from depositing, such as fluorine plastic, may be coated on the inner surface of the frypan 9. In this case, a cooking material does not adhere on the frypan 9, and the frypan can be kept clean. Further, the frypan 9 can not be easily heated by the microwaves and a danger of burning of the cooking material on the frypan 9 can be prevented.

FIRST EMBODIMENT OF THE MICROWAVE HEAT COOKING APPARATUS MAIN BODY

Figure 7:
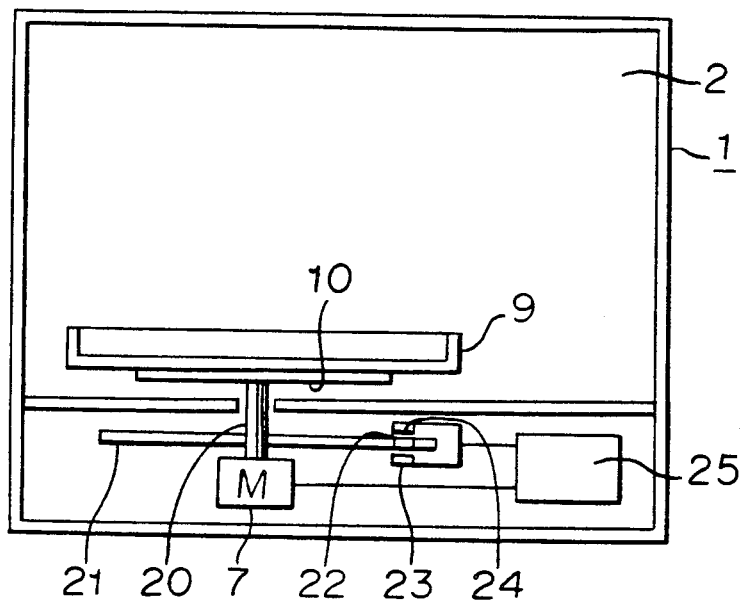
FIG. 7 is a diagram showing the entire structure of the first embodiment of the microwave cooking apparatus main body of the present invention.

As shown in FIG. 7, a circular plate 21 is attached to a rotary shaft 20 of a rotating plate 10 so as to be perpendicular to the rotary shaft 20. An elliptic opening 22 is formed at the edge portion of the circular plate 21. A light emitting element 23 and a light receiving element 24 are provided above and below the circular plate 21 so as to oppose each other through the opening 22. A control means 25 is provided to receive an input from the light receiving element 24 and it controls the operation of a motor 7.

Figure 8:
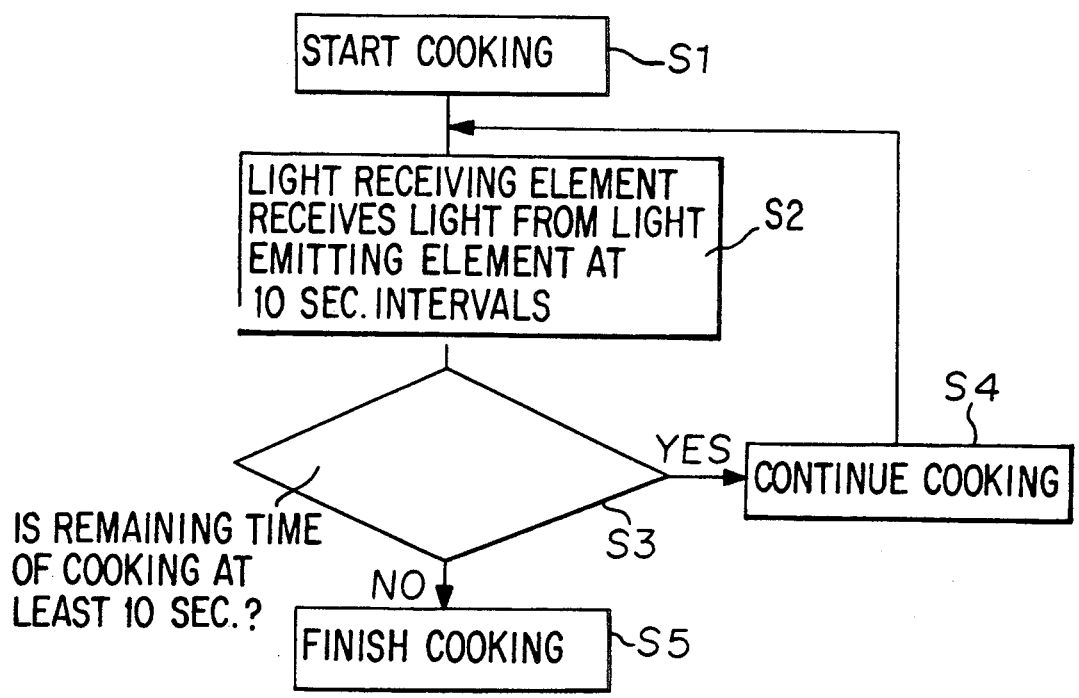
FIG. 8 is a flow chart showing the operation of the first embodiment of the microwave cooking apparatus main body shown in FIG. 7.

As shown in a flow chart in FIG. 8, when cooking is initiated at Step $S_1$, the circular plate 21 is rotated by the actuation of the motor 7. The circular plate 21 is rotated in synchronism with the frypan 9 in the heating chamber 2 at a speed of about 10 seconds per revolution. During the revolution of the circular plate 21, the light receiving element 24 receives light from the light emitting element 23 when the opening 22 comes between the light emitting element 23 and the light receiving element 24 (Step $S_2$). When the control means 16 receives an input from the light receiving element 24, it detects a remaining time for cooking. At Step $S_3$, when the remaining time for cooking is 10 seconds or more, the operation of the motor 7 is continued (at Step $S_4$). On the other hand, the remaining time is less than 10 seconds, the motor 7 is instantaneously stopped at Step $S_5$. By adjusting the operation as described above, the handle 11 is always stopped at the same position as that of the initiation and the completion of cooking, and the position of the handle can be usually at the front of the cooking apparatus so that the frypan 9 can be easily taken out.

In the embodiments as shown in FIGS. 7 and 8, the rotation of the frypan 9 is controlled by using the light emitting and receiving elements. However, the rotation of the frypan 9 may be controlled by using a magnet relay or a mechanical structure. In addition, other measures may be taken to perform the same function.

SEVENTH EMBODIMENT OF THE FRYPAN

Figure 9:
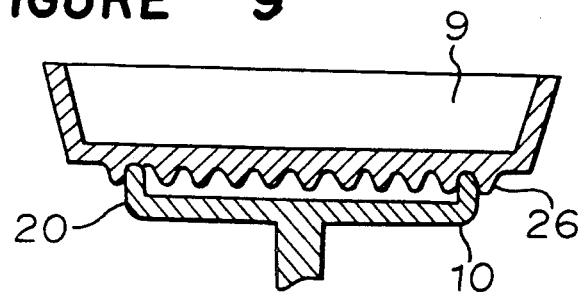
FIGS. 9 through 11 are respectively diagrams showing several states of the frypan according to the seventh embodiment of the present invention.
Figure 10:
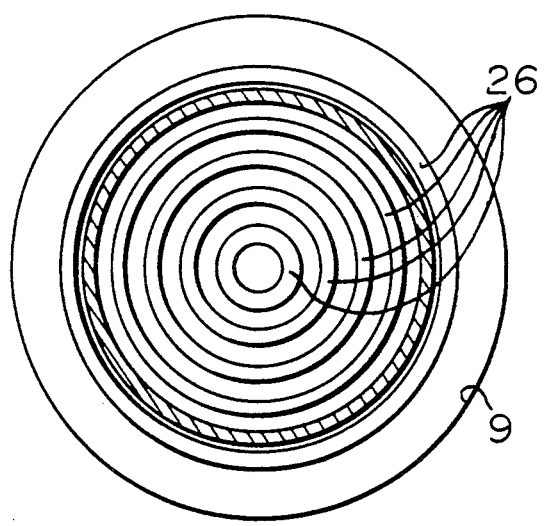
Figure 11:
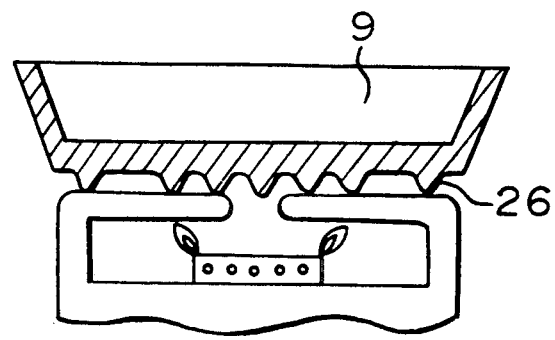

When cooking of a cooking material is conducted by using a microwave cooking apparatus having a motor 7 for rotating the rotating plate which supports the frypan 9 from the lower part, a plurality of frypan ribs 26 may be formed which project from the outer bottom surface of the frypan 9 in a concentric manner as shown in FIGS. 9 and 10. By arranging at least one of the frypan ribs 26 to engage with ribs 20 formed at the circumferential edge portion of the rotating plate 10, the frypan 9 can be always supported at a predetermined position on the rotating plate 10, and an accident of falling of the frypan 9 from the rotating plate 10 can be prevented. When the frypan 9 having the ribs 26 is put on a portable cooking stove at the time of cooking, the frypan ribs 26 are engaged with the kettle holder, whereby the frypan 9 can be supported horizontally by a kettle holder in a stable manner regardless of the size of the kettle holder.

The frypan ribs 26 provide reinforcement to the frypan 9. Easy handling of the frypan 26 can be obtained by forming a plurality of frypan ribs 26. A single number of the frypan rib 26 is sufficient so long as it can be correctly filled to the kettle holder.

To form a plurality of frypan ribs 26 increases the surface area of the outer bottom surface of the frypan, whereby heat from the portable cooking stove can be effectively absorbed.

EIGHTH EMBODIMENT OF THE FRYPAN

The eighth embodiment of the frypan will be described with reference to FIGS. 12 and 13. FIGS. 12 and 13 show a rotating plate 10 modified from that of the rotating plate in a circular form shown in FIG. 9. The eighth embodiment of the frypan is to eliminate scattering in the strength of the bottom surface of the frypan 9, to avoid a thermal deformation of it and to reduce the weight of the frypan 9.

As shown in FIGS. 12 and 13, the shape of a rib 20 formed in the rotating plate, which constitutes the contacting surface of the rotating plate 10 to the frypan, 9 is elliptic, and a frypan rib 27 having a large circle is formed at the outer bottom surface of the frypan 9 so that the large diameter frypan rib 27 is engaged with the outside of the longer diameter portion 29 of the rib 20 and a rib 28 having a small circle is formed at the outer bottom surface of the frypan 9 so that the inner side of the rectangular portion 30 of the rib 20 is engaged with the small diameter frypan rib 28, whereby an unstable contacting state between the rotating plate 20 and the frypan 9 can be minimized and the space between the frypan ribs 26 can be broaden. Further, when an additional frypan rib 26 is to be formed inside the inner frypan rib 26, a broader space can be obtained for the additional frypan rib 26, and the weight of the frypan 9 is not increased.

By selecting suitably a ratio of a longer diameter portion 29 and the shorter diameter portion 30, the distance between the frypan ribs 26 can be changed.

The rotating rib of an elliptic form reduces cost for a material to be used for the rotating plate 10.

FIG. 14 shows that the frypan 9 is put on a portable cooking stove. The rotating plate 10 as shown in FIG. 13 may be a modified elliptic form instead of the regular elliptic shape.

SECOND EMBODIMENT OF THE MICROWAVE COOKING APPARATUS MAIN BODY

As shown in FIGS. 15 and 16, guide walls 33 having a substantially trapezoidal shape in cross section and made of a material of heat resistance are formed bridging the front surface 31 and the side surfaces 32 of the heating chamber. A first slanting surface 34 is formed at the inner part and in the front portion of each of the guide walls 33 so as to guide the frypan 9 into the heating chamber while the outer circumferential surface of the frypan 9 is brought into contact with the first slanting surface 34. Accordingly, when the frypan 9 is put into the microwave cooking apparatus main body or is removed from the same, there is no danger that the outer peripheral portion of the frypan 9 hits the other portion of the main body, whereby a deformation by hitting or a trace of hitting in the main body is avoidable. When the frypan 9 is removed from the main body, the second slanting surfaces 35 guide the frypan 9.

If the guide walls 33 are supported by springs positioned at the side surfaces of the heating chamber 2, a shock caused when the frypan 9 hits the guide wall 33 is avoidable, whereby easiness of handling is further improved.

The shape of the guide walls 33 may be a semi-circular shape to obtain the same effect.

THIRD EMBODIMENT OF THE MICROWAVE COOKING APPARATUS MAIN BODY

FIGS. 17 and 18 show a microwave heat cooking apparatus without a rotating plate 10. In this embodiment, a recess is formed as a handle receiving chamber 36 in the microwave cooking apparatus main body to be communicated with the heating chamber 2. Thus, a frypan 9 having an elongated handle 11 can be put in the main body by receiving the handle 11 in the handle receiving chamber 36. Since the handle 11 is received in the handle receiving chamber 36, microwaves are prevented from to entering into the chamber 36 and the handle 11 is not heated.

FOURTH EMBODIMENT OF THE MICROWAVE COOKING APPARATUS

A pivot shaft 37 is provided at the outer peripheral portion 12 of the frypan 9 and a handle 11 is pivotally supported by the pivot shaft 37 so as to be turnable in the horizontal direction with respect to the heating surface 13 of the frypan 9 as shown in FIG. 19. With such construction, when the frypan 9 is put in the heating chamber 2, it is possible to place horizontally the handle 11 so as to extend in parallel to the front surface of the microwave cooking main body. Accordingly, the space of the handle receiving chamber 36 can be small and a loss space can be minimized.

The shafts 15, 17, 37 as shown in FIGS. 4, 5 and 19 are adapted to strongly push the handle 11 to the frypan 9 so as not to cause the movement of the handle 11 unless a predetermined external force is applied to the handle 11.

FIFTH EMBODIMENT OF THE MICROWAVE COOKING APPARATUS MAIN BODY AND NINTH EMBODIMENT OF THE FRYPAN

The fifth embodiment of the microwave cooking apparatus main body and the ninth embodiment of the frypan will be described with reference to FIGS. 20 through 27 and FIG. 37.

Figure 21:
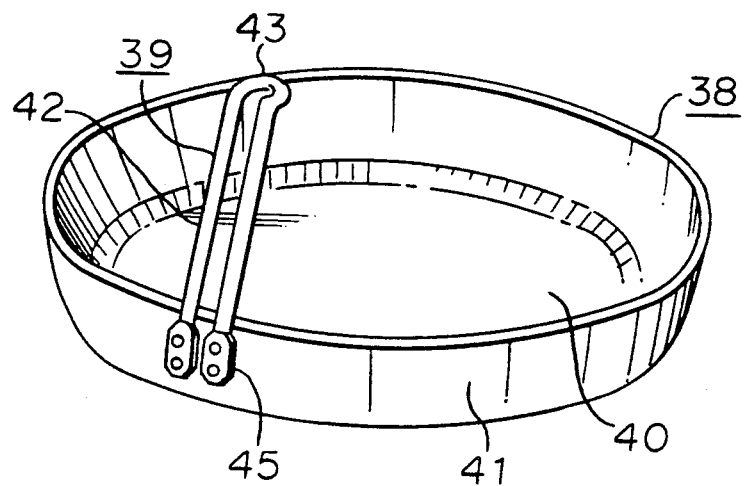
FIGS. 21 and 22 are respectively perspective views of the ninth embodiment of the frypan.
Figure 22:
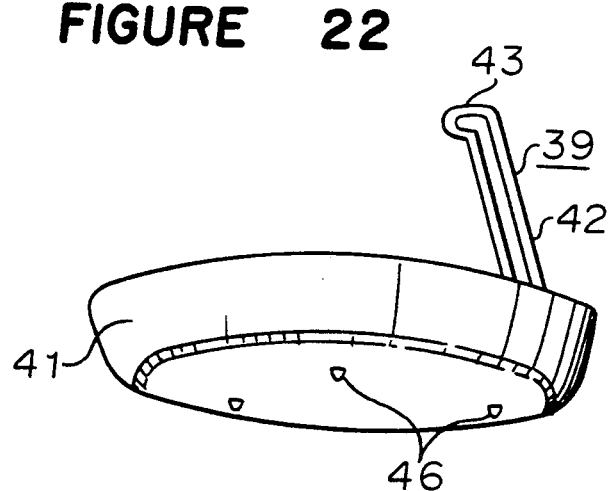
Figure 23:
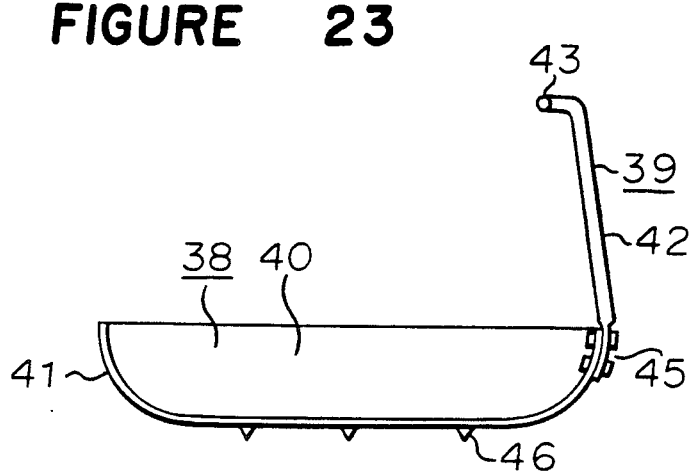
FIGS. 23 through 25 are respectively a front view, a plane view and a side view of the ninth embodiment of the frypan.
Figure 24:
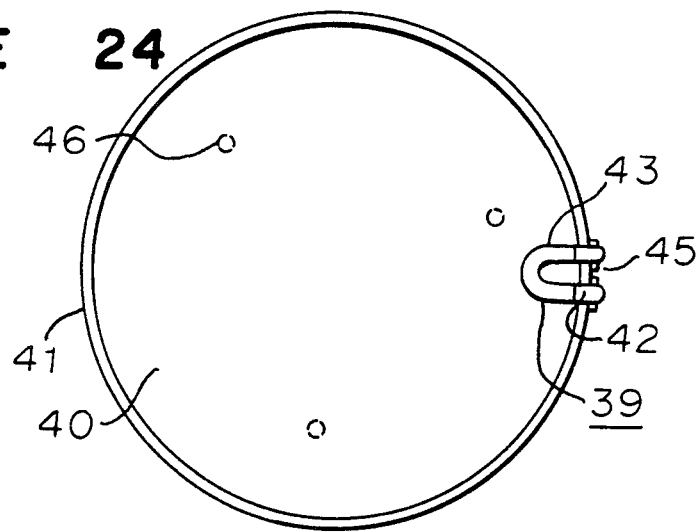
Figure 25:
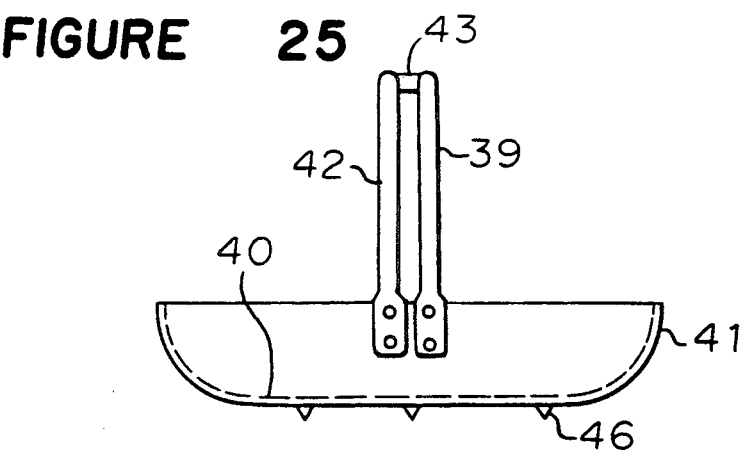
Figure 26:
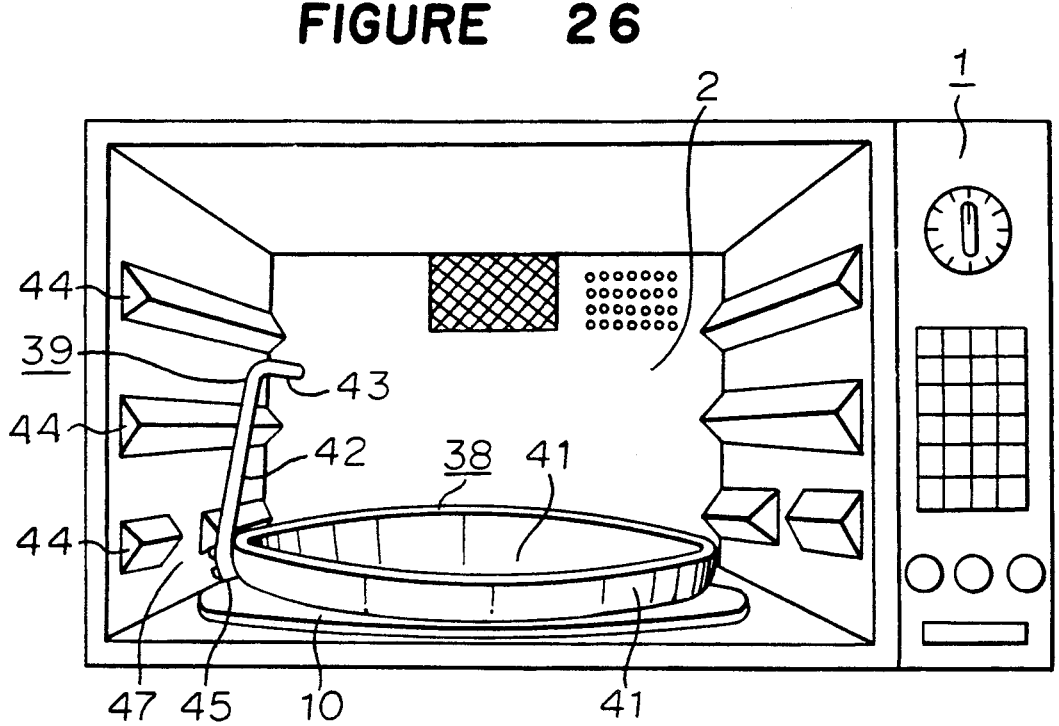
FIG. 26 is a perspective view showing the heating chamber as shown in FIG. 20.
Figure 27:
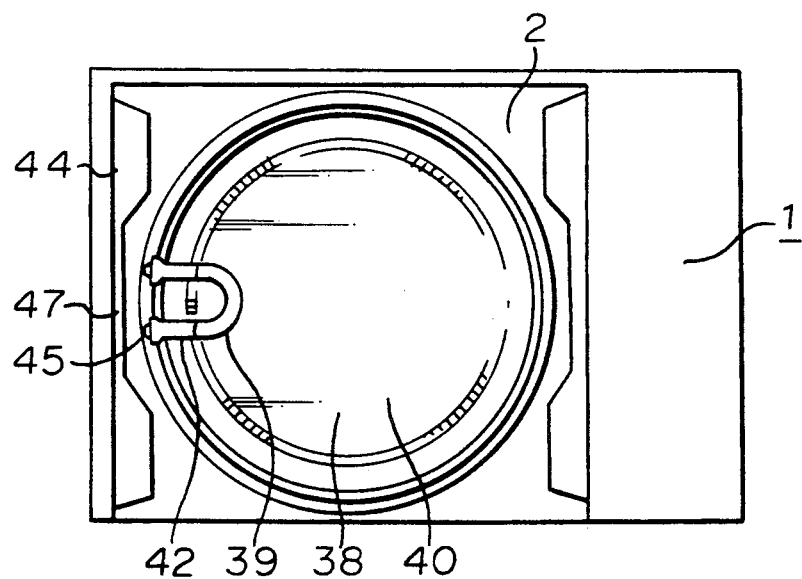
FIG. 27 is a plane of the microwave heat cooking apparatus main body as shown in FIG. 20 wherein the upper plate is omitted.

FIG. 20 is a diagram showing the entire structure of a microwave cooking apparatus main body, FIGS. 21 and 22 are respectively perspective views of the ninth embodiment of the frypan, FIGS. 23 through 25 are respectively a front view, a plane view and a rear view of the ninth embodiment of the frypan, FIG. 26 is a perspective view of the heating chamber shown in FIG. 20 and FIG. 27 is a plane view of the main body as shown in FIG. 20 in which a top wall is removed.

In the Figures, numerals 1–4 and 6 and 7 designate the same elements as in FIG. 36 and therefore, description is omitted. A numeral 38 designates a frypan which is rotatably supported by a rotating plate which is in contact with the lower part of the frypan 38 and which is driven by a motor 7. The frypan 38 is constituted by a handle 39 made of stainless steel and a body portion 40 made of an iron plate. The body portion 40 of the frypan has a diameter of 250 mm, a depth of 50 mm and a radius of curvature of the portion between the bottom and the outer peripheral portion. Four apertures are formed at the upper part of the outer peripheral portion 41 of the body 40, which are used for attaching the handle 39 by caulking with rivets. The handle 39 is formed in such a manner that a steel rod having a diameter of 8 mm is bent at the middle portion into a U-shape whose width is 28 mm, the bent portion is further bent in the direction perpendicular to the plane of the U-shaped bent portion, the further bent portion having a length of 18 mm, the free ends extending in parallel to each other are subjected to a rolling operation so that the width of the flattened portions formed by the rolling operation is 14 mm, the length is 26 mm and the thickness is 3.5 mm each. Then, two holes for rivet caulking are formed in each of the flattened portions. Thus formed four holes are aligned with the holes formed in the body portion 40 and they are connected by caulking flat-head rivets made of stainless steel. The handle 39 connected to the body portion 40 has a height of 118 mm from the upper edge of the body portion 40 so as to have a length corresponding to a multiple of a wavelength of $\lambda/4$. The handle is inclined by 12° toward the body portion 40. The upper end of the handle 29 is further projected toward the center of the body portion 40 by 18 mm in parallel to the bottom surface of the body portion 40. The slanting portion of the handle 39 is referred to a grip portion 42 and the portion projecting by 18 mm is referred to as an end portion 43 and the flattened portion connected to the body portion 40 by caulking is referred to as a connecting portion 45.

Three projections 46 are formed at the outer bottom surface of the body portion 40 so that the center of the frypan 38 is located inside the triangle defined by connecting the three projections. A numeral 44 designates dish receiving shelves formed at both inner side walls of the heating chamber 2 in three rows, i.e. the upper shelves, the middle shelves and the lower shelves. The lower shelves 44 are respectively provided with cut portions 47 at the middle part. The distance between the cut portions of the opposing lower shelves is determined to be longer than the greatest diameter of the frypan 38 placed in the horizontal direction.

An electric insulation layer made of material such as enamel, fluorine resin or the like is applied to the inner wall of the heating chamber 2. The height of the frypan 38 including the handle 39 is at least 2 cm lower than the distance between the ceiling of the heating chamber 2 and the upper plane of the rotating plate 10.

A method of cooking will be described. The frypan 38 is taken out from the cooking chamber 2 and oil is applied to the heating surface of the frypan 38. Then, the frypan is put on a cooking stove (which may an electric heater, a gas heater, an electromagnetic induction stove, a portable clay cooking stove or the like) and provisionally cooking is carried out by strongly heating a material to be cooked. When a burn portion is given to the reverse side (which is in contact with the frypan 38) of the cooking material 6, it is reversed by a flat spoon. Thereafter, the cooking material 6 is put into the heating chamber 2 together with the frypan 38, and regular cooking is carried out by baking the inside of the cooking material 6 by microwaves.

A burn portion is also given to the top surface of the cooking material 6 which has been reversed and is in contact with the cooking surface of the frypan 38 which has been supplied with the oil. Thus, both surfaces of the cooking material 6 are quickly burnt so as to have burn portions, and at the same time, the inside of it is sufficiently heated, whereby a time of cooking is remarkably shortened.

In an example of cooking a hamburg steak, it took about 2-3 minutes in order to give a burn portion by a portable cooking stove and it took about 3-4 minutes in order to sufficiently heat the inside of the hamburg steak in a microwave cooking apparatus main body 1. It is only less than $\frac{1}{3}$ to finish the cooking in comparison with the conventional method of cooking. Practical effect is great for kitchens which are usually busy. Further, cooking time is short because the microwaves are used. As shown in Table 1, reduction in weight of meat meals such as hamburg steak is small after cooking and the cooked meat is soft and tasty.

TABLE 1

| Method of cooking | (Two hamburg steaks of 150 gr were cooked) | | | | | |
|---|---|---|---|---|---|---|
| | Use of frypan of the present invention | | Use of electronic oven | | Use of a conventional frypan | |
| Time of cooking | Heating by a portable cooking stove | 2 min. | Preliminary heating by the oven | 15 min. | Heating by a portable cooking stove | 9 min. |
| | Heating by microwaves | 4 min. | Preliminary heating by the oven | 12 min. | Total | 9 min. |
| | Total | 6 min. | Total | 27 min. | | |
| Weight after cooking | 140 g | | 135 g | | 130 g | |
| Hardness by feeling test | Inside and outside: soft | | Inside: normal Outside: hard | | Inside: normal Outside: very hard (Surface: very very hard) | |

Figure 37:
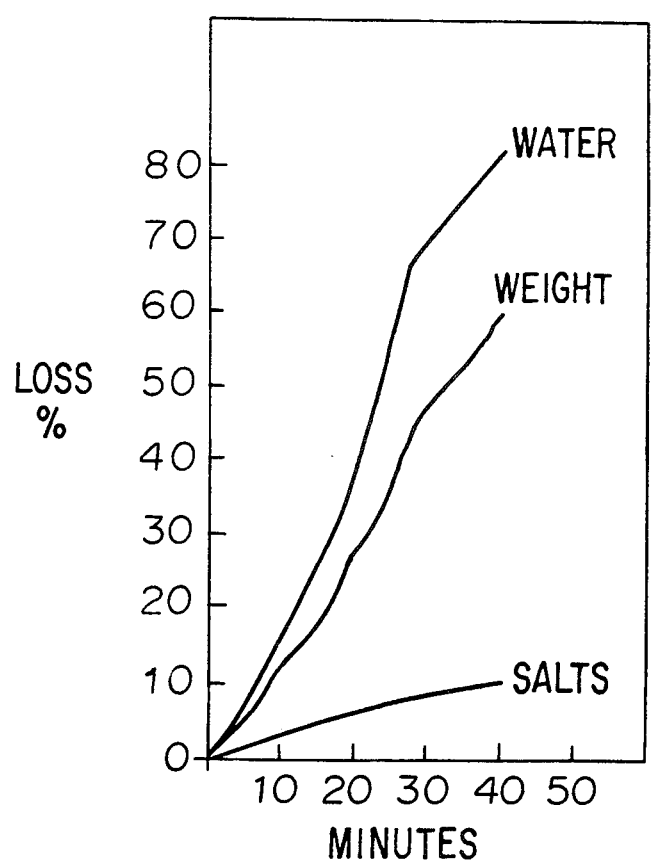
FIG. 37 is a graph showing a relation of softness of meat to time of cooking.

There is a description of "in many cases, it seems that a time of heating definitely affects softness of meat rather than heating temperature" with respect to a relation of a time of heating and softness of meat, in line 20 of page 32 in "Lecture of Science of Cooking vol. 2, Science of Basic Cooking II" published by Asakura Shoten on Mar. 30, 1962. In page 37 of the publication, a relation of softness of meat to a time of cooking is introduced by a graph as shown in FIG. 37 in a case that beef (50 g) is cooked by a gas oven (210° C.) for 40 minutes.

The frypan 38 of the present invention can reduce the number of conventional frypans for domestic use because it can also be used for cooking materials only by portable cooking stoves.

Further, it is unnecessary to provide a space or a location for placing the frypan in a kitchen because it can be received in the microwave cooking apparatus after cooking has been finished.

In the above-mentioned embodiments, the regular cooking is carried out in the microwave cooking apparatus after the provisionally cooking. However, the same effect can be obtained even by conducting the regular cooking after the provisionally cooking has been carried out with the microwave cooking apparatus.

Since the frypan 38 is durable to a strong heat by a microwave heat cooking apparatus or a portable cooking stove, it is unnecessary to transfer a cooking material 6 to a frypan of ordinary use, whereby a time of cooking can be reduced.

In the frypan of the present invention, a grip portion 42 of the handle 39 of the frypan 38 is arranged at the upper part and inside the outer peripheral portion 41 of the body portion 40. Accordingly, there is no danger of a spark caused by accidentally contacting the grip portion 42 with the inner wall of the heating chamber 2 when the frypan is put in the heating chamber or it is rotated therein. Since the frypan 38 has no conspicuous projecting part, the frypan 40 having a larger body portion 40 can be put in the heating chamber 2.

When the frypan is put in the heating chamber or is removed from the same, an external force (pulling force) is repeatedly applied to the grip portion 42. Therefore, the grip portion 42 tends to be deformed outwardly. However, in the present invention, the grip portion is previously arranged inside the outer peripheral portion 41 of the body portion 40. Accordingly, it is no possibility that the grip portion projects outwardly from the outer peripheral portion 41 of the body portion 40 even though there causes a deformation in the handle, and a disadvantage of hitting of the grip portion to the inner wall of the heating chamber 2 when the frypan is turned on the rotating plate can be prevented.

The frypan 38 of the present invention is easy to handle because the grip portion 42 is located toward the center of gravity. In particular, since the moment on the grip portion is greatly reduced in comparison with a conventional frypan with a handle, the touch of the frypan when the grip portion is grasped by a hand is very light. Further, since the grip portion 42 is inclined toward the center of the body portion 40, it is easily fitted to the shape of a hand and it is easy to carry the frypan. If there is slippage in hand, the end portion 43 functions as a stopper because the end portion 43 is bent. Accordingly, an accident of injury can be minimized. The bent end portion 43 can be utilized as a hanging portion or a supporting portion for the cooking material 6. When the frypan 38 is put on a portable cooking stove, heat does not come to the grip portion 42 because it is inside the outer peripheral portion 41 of the body portion 40 to thereby prevent the grip portion 42 from heating.

In the present invention, the handle 39 is made of stainless steel and has a length of λ/4 times of a wavelength which can reflect radio waves. Accordingly, the handle 39 functions as a stirrer for stirring the microwaves when the frypan 38 is rotated in the heating chamber 2 and a high frequency waves are directed to it. Therefore, uneven heating to the cooking material 6 can be prevented.

When stainless steel having poor thermal conduction property is used for the handle 39, heat can not be easily transmitted to the grip portion 42 when the frypan 38 is heated by a portable cooking stove, and the grip portion 42 is prevented from being heated, hence the frypan 38 is easily movable by a hand.

The handle 39 is made of a round rod-like metallic material without no corner portion, and therefore, it is seldom to occur a spark.

In order to avoid occurrence of a phenomenon that the frypan 38 put on a portable cooking stove becomes unstable because the central portion of the bottom surface of the frypan 38 is deformed downwardly by fire from the stove a projections 46 higher than the central portion are formed at the circumferential portion of the outer bottom surface. Accordingly, the frypan 38 can be supported so as not to cause the direct contact of the bottom surface of the frypan 38 to the portable cooking stove, whereby an unstable state does not occur. The provision of the projections 46 has such effect that when the frypan 38 is rotated on the rotating plate 10 in the heating chamber 2, the rotation of the frypan 38 on the rotating plate 10 around the deflecting portion can be prevented. In taking the advantage that the frypan 38 is prevented from turning around the portion of deformation, the operation of the rotating plate 10 is detected by a photo sensor, a photo switch or the like installed in the microwave cooking apparatus main body 1. Namely, the position of the handle 39 of the frypan 38 is always same when the frypan 38 is put in the heating chamber and when the frypan 38 is removed from the heating chamber after the completion of cooking. The handle 39 of the frypan 38 is always stopped at the same position without causing the rotation of the frypan 38.

The cut portions 47 are provided at the lowest shelves 44. Accordingly, the danger of sparking between the lowest shelves 44 and the connecting portion 45 which projects from the body portion 40 of the frypan 38 can be eliminated. Further, the size of the body portion 40 of the frypan 38 is made large because the cut portions 47 are formed at the lowest shelves 44.

The inner wall of the heating chamber 2 is coated with a material having electric insulation property and difficult to be heated by microwaved, such as fluorine resin. Accordingly, it is seldom to cause a spark between the inner wall of the heating chamber 2 and the frypan 38 even though they come to mutual contact.

In the fifth embodiment of the microwave cooking apparatus main body, the frypan 38 is rotated on the rotating plate 10. However, it is possible to utilize a structure that the frypan 38 is not rotated. In this case, however, the height of the frypan 38 including the handle has to be lower than the length from the ceiling of the heating chamber 2 to the bottom surface of the heating chamber 2.

TENTH EMBODIMENT OF THE FRYPAN

Figure 28:
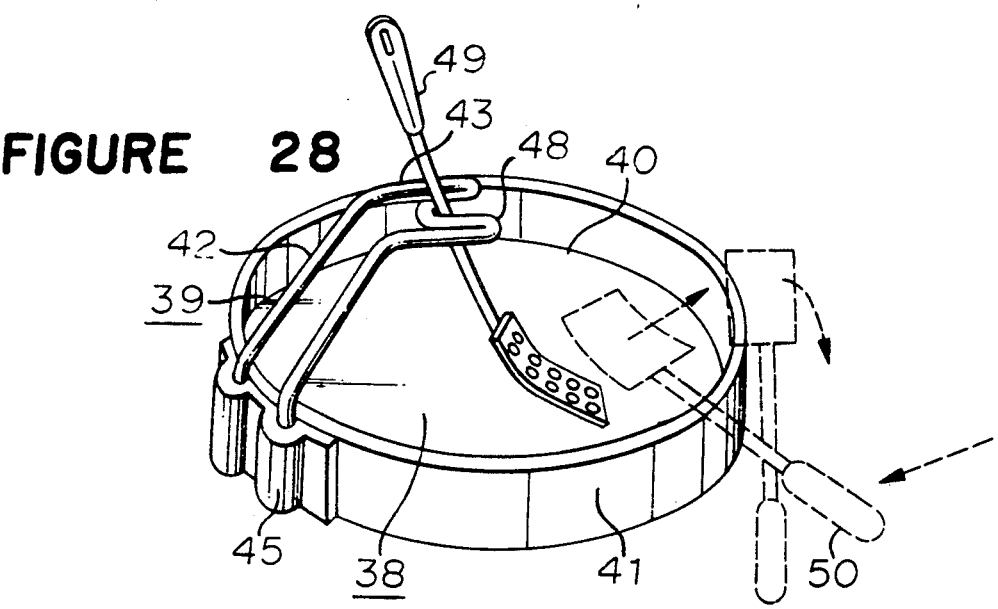
FIG. 28 is a perspective view of the tenth embodiment of the frypan.

A C-shaped clamping portion 48 is formed at the end portion of the handle 39 of the frypan according to the ninth embodiment as shown in FIG. 28 so that a flat spoon 49 can be supported in the vertical direction. With such structure of the clamping portion 48, troubles of dropping the flat spoon, burning the grip portion of the flat spoon, and so on, which is caused by merely putting the flat spoon at the edge of the body portion 40 of the frypan can be prevented.

Figure 29:
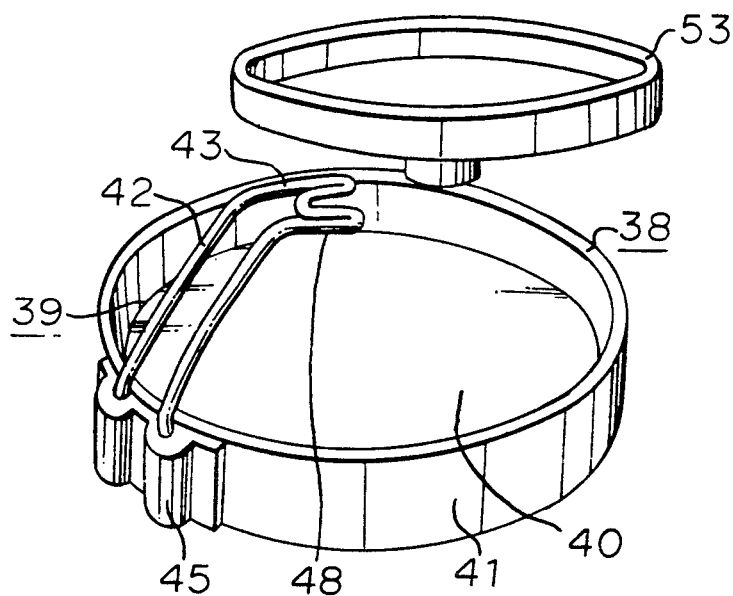
FIGS. 29 and 30 are respectively perspective views showing other practiced applications of the frypan as shown in FIG. 28.

Further, it is possible that as shown in FIG. 29, a second frypan 53 is attached to the clamping portion 48 so that cooking at the upper and lower stages can be conducted simultaneously.

Figure 30:
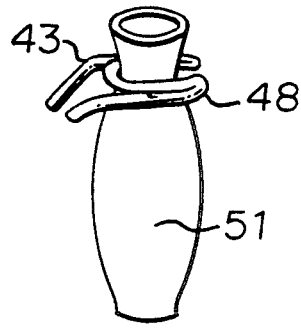

As shown in FIG. 30, a container having a narrowed neck portion 51 can be clamped by the clamping portion.

In the ninth embodiment of the frypan, only one handle 39 is attached to the body portion 40. However, it is possible to attach the handle 39 at two, three, four or more positions in order to facilitate the handling of the frypan.

ELEVENTH EMBODIMENT OF THE FRYPAN

Figure 31:
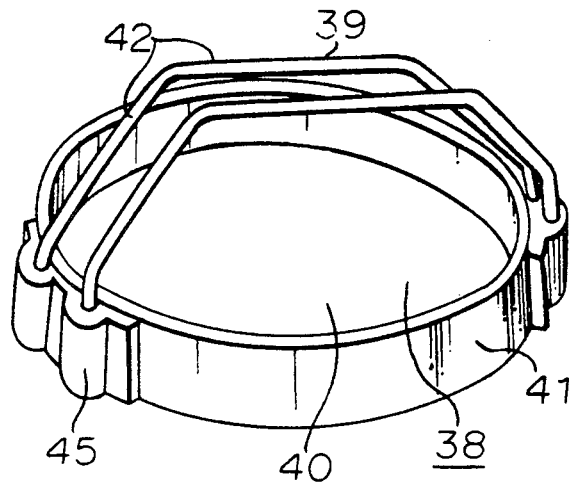
FIG. 31 is a perspective view of the eleventh embodiment of the frypan.

As shown in FIG. 31, the handle 39 may be attached to the body portion 40 of the frypan 38 so as to bridge the outer peripheral portion diametrically. In this case, the handle can be grasped from a side portion or the upper part so that handling of the frypan 38 can be easy.

TWELFTH EMBODIMENT OF THE FRYPAN

Figure 32:
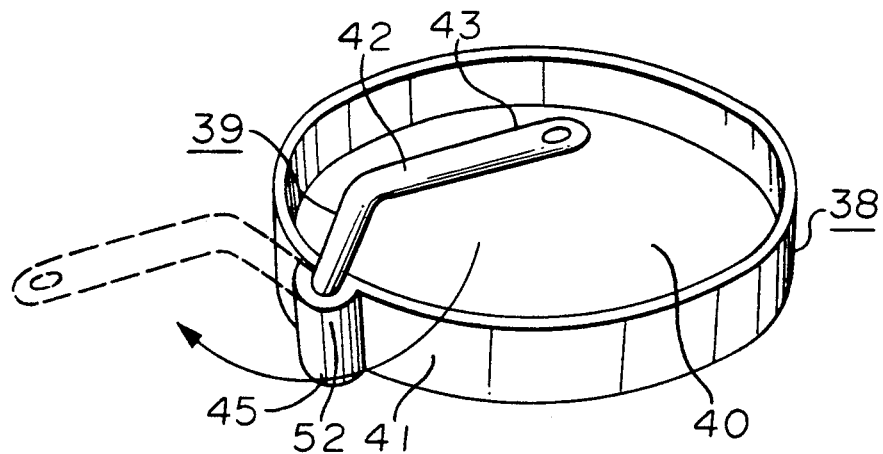
FIG. 32 is a perspective view of the twelfth embodiment of the frypan.
Figure 33:
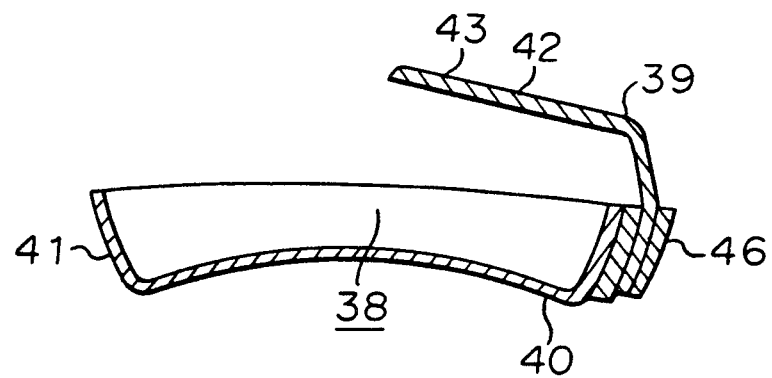
FIG. 33 is a perspective view of the thirteenth embodiment of the frypan.

FIG. 32 shows the twelfth embodiment of the frypan. A bearing block 52 is formed at the outer peripheral portion 41 of the body portion 40. The bearing block 52 has a vertical hole and a handle 39 made of a round rod-like member and having a substantially L-shape is fitted to the hole so as to be turnable in the horizontal direction. Accordingly, when the frypan is put on a heater, the handle 39 is turned outwardly so as to be easily gripped by a handle. On the other hand, when the frypan is put in the heating chamber 2, the handle 39 is turned so as not to project outwardly.

THIRTEENTH EMBODIMENT OF THE FRYPAN

In the ninth embodiment of the frypan, the projection 46 is formed to eliminate the problem of the deformation of the frypan 39 due to a strong heat. However, it is possible that the bottom surface of the frypan 38 is raised upwardly to have a part of a substantially spherical surface so that the outer circumferential edge of the bottom surface of the frypan 38 is brought to contact with the rotating plate. Accordingly, it is possible to avoid the deformation of the central portion of the bottom surface of the frypan 38 is deformed downwardly due to a strong heat from a stove. Further, the heat absorbing coefficient of the frypan on the stove can be improved.

In the above-mentioned embodiment, the cut portions 47 are formed only in the lowest shelves 44. However, the cut portions may be formed in the upper shelves and the middle shelves so as not to cause the contact of the grip portion 42 to these shelves even though the grip portion 42 is formed in the vertical direction from the connecting portion 46 or the grip portion 42 located inside the outer peripheral portion 41 of the frypan is deformed toward the outer peripheral portion 41. This provides more safety cooking.

In the ninth embodiment, the handle 39 is made of stainless steel. However, another material may be used. For instance, the handle 39 may be covered by a material such as fluorine resin which has electric insulation property and is difficult to be heated by microwaves, whereby a spark caused by the contact of the handle to the inner wall surface of the heating chamber can be prevented, and the handle does not become hot by the microwaves. Accordingly, it is easy to handle the frypan 38. The handle may be made of a square bar having rounded corners instead of using a round rod.

FOURTEENTH EMBODIMENT OF THE FRYPAN

Figure 34:
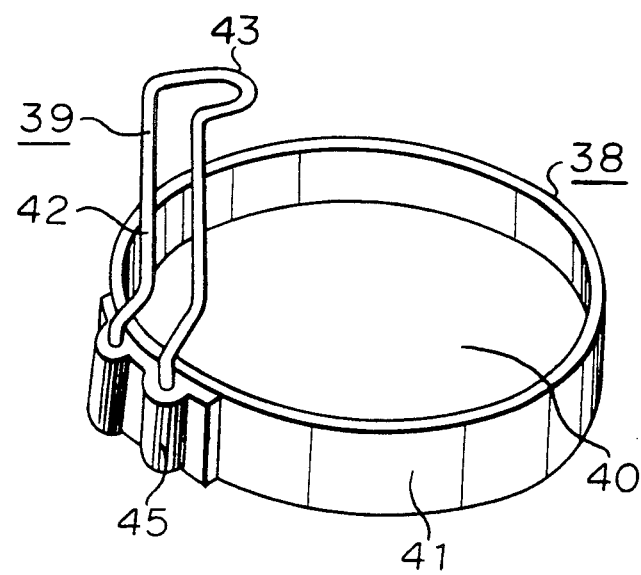
FIG. 34 is a perspective view of the fourteenth embodiment of the frypan.

As shown in FIG. 34, the handle 39 bent in a U-shape is so formed that the root portion of the handle 39, i.e. the portion near the connecting portion 45 is bent toward the upper portion of the body portion 40, and then, it is extended in the vertical direction, instead of providing the handle 39 which is inwardly inclined as in the ninth embodiment.

The handle 39 may be extended either from the inner peripheral portion of the frypan 38 or from the inner bottom surface of the frypan 38.

FIFTEENTH EMBODIMENT OF THE FRYPAN

Figure 35:
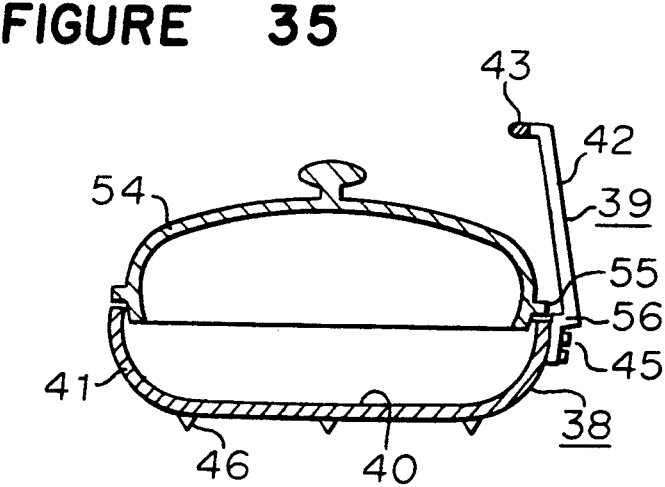
FIG. 35 is a perspective view of the fifteenth embodiment of the frypan.

As shown in FIG. 35, a flange 55 is formed at the outer edge portion of the cover 54 for the frypan 38. The portion between the grip 42 and the connecting portion 45 of the handle 39 may be bent to form an escape portion 56 so that the attachment or removal of the cover 54 can be easy.

In the above-mentioned embodiments, a time of cooking can be greatly reduced because a cooking material put on the frypan can be cooked together with the frypan on both the portable cooking stove and the microwave heat cooking apparatus.

Since the frypan being durable a strong heat generated from the microwave heat cooking apparatus and the portable cooking stove is used, it is unnecessary to transfer the cooking material from the above-mentioned frypan to an ordinary frypan usable in home, and accordingly, a time of cooking can be shortened.

The frypan of the present invention has a substantially circular form. Accordingly, a large surface are can be formed in the frypan in order to rotate it in the microwave cooking apparatus, whereby the volume of a cooking material can be increased and uneven heating of the material is avoidable.

By attaching a handle or handles, it is easy to move the frypan.

The handle can be folded toward the center of the frypan. Accordingly, an extension from the frypan can be reduced, and the surface area of the frypan can be increased. Further, since the handle is made of a material difficult to be heated by microwaves, there is substantially no temperature rise in the handle, and handling operation for the frypan can be easy.

Use of the cover made of a material which allows the microwaves to pass through used for the frypan, whereby scattering of a cooking material is avoidable.

The outer surface of the frypan is coated with a material which is capable of absorbing the microwaves to thereby generate heat, and the energy of the microwaves can be absorbed, whereby a time of cooking is shortened.

The inner surface of the frypan is coated with a material which is difficult to be heated by the microwaves and prevents a cooking material from adhering. Excessive heating of the frypan is avoidable and occurrence of burning can be prevented.

The handle receiving chamber formed in the heating chamber receives the elongated handle.

The control means always stops the handle of the frypan at a predetermined position when cooking is finished, so that it is easy to take out the frypan.

Since a number of ribs is formed at the lower part of the frypan, there is no possibility to cause an unstable state of the frypan when it is put on a stove. Further, thermal efficiency is improved.

The guide wall formed in the heating chamber guides the outer peripheral portion of the frypan, whereby a deformation and a trace by hitting in the microwave heat cooking apparatus main body can be avoided.

The grip portion is formed above and inside the outer peripheral portion of the frypan. Accordingly, when the frypan is rotated in the microwave cooking apparatus main body, the grip portion does not hit the inner wall of the main body. Accordingly, there is no possibility of occurring a spark. Even though the handle is deformed during a long term use, it does not hit the inner wall of the main body.

The handle made of metal functions to stir microwaves in the main body to thereby avoid uneven heating to a cooking material.

Cutting portions are formed in at least the lowest shelves formed in the heating chamber so as not to cause a spark between the handle of the frypan and the inner wall of the microwave cooking apparatus main body.

The projection formed at the bottom surface of the frypan eliminates an unstable state of the frypan on the rotating plate, the unstable state being resulted from the deformation of the bottom portion of the frypan due to heat. Further, the bottom portion of the frypan can be previously raised upwardly to thereby prevent the deformation of the bottom surface in the downward direction.

By applying a surface treatment of a material having electric insulation property prevents a spark caused by the contact of the frypan to the inner wall of the microwave cooking apparatus main body.

We claim:
1. A microwave cooking apparatus comprising:
a microwave cooking apparatus main body;
a frypan which is received in said main body, said frypan being safe for both microwave cooking and flame cooking;
said frypan having a handle attached thereto, said handle extending upwardly and inwardly from a side of the frypan and having a grip portion, said handle having a length of a multiple of one-fourth of the wavelength of the microwaves of said microwave cooking apparatus.
2. A microwave cooking apparatus comprising:
a microwave cooking apparatus main body;
a frypan which is received in said main body, said frypan being safe for both microwave cooking and flame cooking;
said frypan having a handle permanently attached thereto, said handle extending upwardly and inwardly from a side of the frypan and having a grip portion, said handle having a length of a multiple of one-fourth of the wavelength of the microwaves of said microwave cooking apparatus.

* * * * *